May 6, 1947.        M. W. MARIEN        2,420,047
COMPOSITE SEALING RING
Filed May 3, 1945

INVENTOR.
BY Melvin W. Marien.
ATTY.

Patented May 6, 1947

2,420,047

UNITED STATES PATENT OFFICE 2,420,047

COMPOSITE SEALING RING

Melvin W. Marien, St. Louis, Mo., assignor to Ramsey Accessories Manufacturing Corporation, St. Louis, Mo., a corporation of Missouri Application May 3, 1945, Serial No. 591,672

1 Claim. (Cl. 286—7)

My invention has relation to improvements in sealing rings and it consists in the novel features of construction more fully set forth in the specification and pointed out in the claim.

The invention is concerned primarily with a ring for sealing a shaft against leakage of oil from points where the shaft emerges from a housing, and its principal object is to form such ring of a flexible steel ring combined with a rubber component in such manner that the sealing ring will be both effective and durable. The manner of accomplishing this object, together with other advantages inherent in the invention, will be better apparent from a detailed description thereof in connection with the accompanying drawings, in which—

Figure 1:
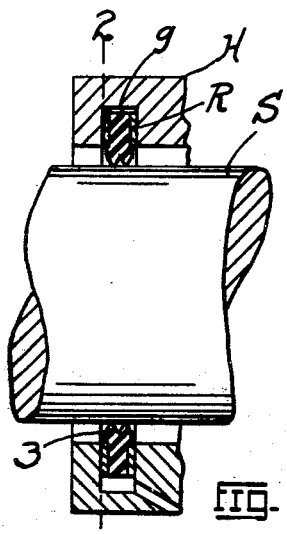
Figure 2:
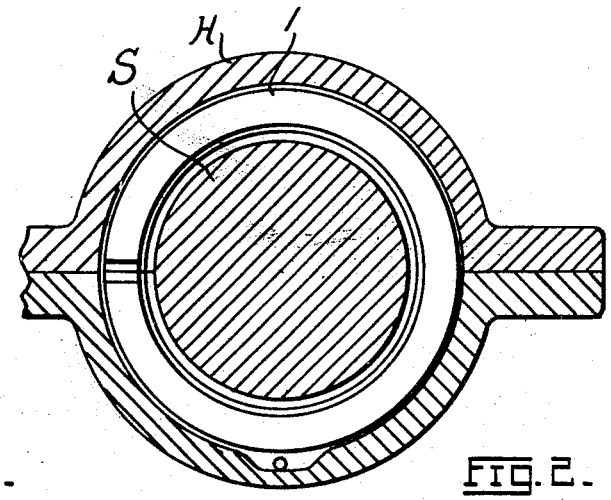
Figure 3:
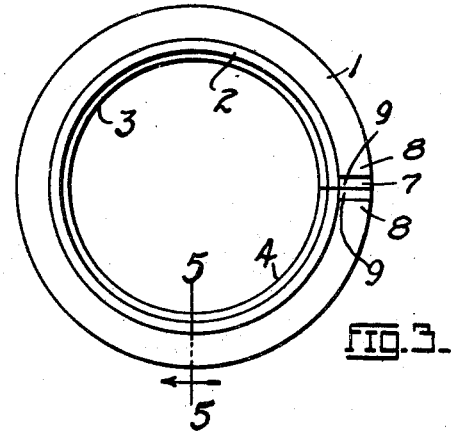
Figure 4:
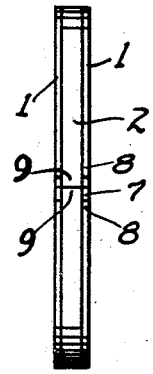
Figure 5:
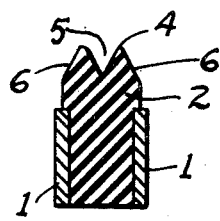

Figure 1 is a middle vertical section of a housing showing my improved sealing ring mounted on a shaft; Figure 2 is a vertical section taken on a plane indicated by the line 2—2 of Figure 1; Figure 3 is a side view of the sealing ring; Figure 4 is an edge view thereof; and Figure 5 is an enlarged cross section taken on the line 5—5 of Figure 3.

Referring to the drawings, S represents a shaft passing through the housing H in which there is an annular groove g for retaining my improved sealing ring R. The ring R is of a composite unitary construction built up of two thin steel rings 1, 1 with a rubber (or equivalent material) ring 2 sandwiched in between. The rings 1, 1 and ring 2 could be cemented but are preferably bonded together in a manner that the rubber adheres to (or is combined with) the surface of the steel rings with such tenacity that it is impossible to separate them by force. Methods of accomplishing a bond of this nature are known to those skilled in the art and I make no claim to such bonding per se.

It will be observed that the steel ring components 1, 1 are somewhat narrower radially than the rubber ring component 2 so that when the components are bonded together, the rubber component will extend radially inward beyond the steel components 1, 1 to form a seat portion 3 for engagement with shaft S. The diameter of the inner surface 4 of component 2 is slightly smaller than that of the shaft S for which ring R furnishes an oil seal, and said surface has a circumferential groove 5 formed in it so that it may be more readily forced over shaft S. The beveling of outer edges 6, 6 also facilitates the application of the ring R to the shaft.

The width of groove $g$ is slightly less than the overall thickness of ring R so that the ring is slightly compressed into the groove and the steel rings 1, 1 will exert some pressure against the side walls of groove $g$. As the shaft S is rotated, the rings 1, 1 will have sliding contact with the side walls of groove $g$, and sufficient oil will always be present to maintain this sliding contact with a leakage of oil past ring R.

Obviously, the composite ring R should be designed so that there will be a gap 7 between steel ring ends 8, 8 while the ends 9, 9 of rubber ring 2 will abut when the ring R is in place on the shaft S. At this time, the steel rings 1, 1 will be stressed outwardly and will accordingly exert a contracting pressure so that the ring assembly will tightly grip shaft S.

Having described my invention, I claim:

In combination with a housing and a shaft passing therethrough, a sealing ring between the shaft and the housing, said housing having a ring groove to receive the sealing ring, said sealing ring comprising an integral resilient ring component of rubber or equivalent material and a thin metallic ring component arranged flatwise with respect to and on each side of the rubber component, said metallic ring components being bonded to the rubber component and being radially resilient so as to exert inward radial force on said rubber component when the sealing ring is on a shaft whereby the sealing ring rotates with the shaft and the metallic ring components are in sliding contact with the sides of the ring groove.

MELVIN W. MARIEN.

REFERENCES CITED

The following references are of record in the file of this patent:

UNITED STATES PATENTS

| Number | Name | Date |
|---|---|---|
| 2,273,380 | Searles | Feb. 17, 1942 |
| 1,901,580 | Bott | Mar. 14, 1933 |
| 2,348,587 | Antonelli | May 9, 1944 |